United States Patent [19]

Dunn, Jr. et al.

[11] 4,007,304

[45] Feb. 8, 1977

[54] METHOD FOR COATING SURFACES

[75] Inventors: James L. Dunn, Jr., Lake Jackson; John K. Ward, Angleton; Patrick H. Martin, Lake Jackson, all of Tex.

[73] Assignee: The Dow Chemical Company, Midland, Mich.

[22] Filed: June 23, 1975

[21] Appl. No.: 589,226

Related U.S. Application Data

[63] Continuation of Ser. No. 237,274, March 23, 1972, abandoned.

[52] U.S. Cl. .............................. 427/314; 427/318; 427/335
[51] Int. Cl.$^2$ ...................... B05D 3/04; B05D 1/36
[58] Field of Search .......... 427/314, 318, 335, 377, 427/385 R, 388

[56] References Cited

UNITED STATES PATENTS

| | | | |
|---|---|---|---|
| 2,438,366 | 3/1948 | Illingworth et al. | 427/377 |
| 2,861,897 | 11/1958 | Hendrixson | 427/318 |
| 3,073,721 | 1/1963 | Pokorny | 427/385 |
| 3,597,257 | 8/1971 | Dunn | 427/314 |

*Primary Examiner*—James R. Hoffman
*Attorney, Agent, or Firm*—Glwynn R. Baker

[57] ABSTRACT

A method for coating surfaces with organic film-forming compositions, which may contain pigments or coloring matter, characterized by applying the composition to a surface or substrate while subjecting the surface or substrate to a gaseous environment whose temperature is above the boiling point of the vaporizable solvent vehicle(s) of the coating composition and removing the solvent vehicle from the applied coating in a controlled manner while in said gaseous environment. The temperatures of the environment, the surface and the coating composition are selected relative one to the other such that the film of coating will gel yet not "skin over" until the solvent vehicle has been substantially completely removed from the coating, the solvent vehicle will not be substantially lost from the coating composition until the coating has been applied to the surface, or substrate, and the application of the coating to the surface or substrate will not materially cool the surface or the environment.

4 Claims, 3 Drawing Figures

METHOD FOR COATING SURFACES

This is a continuation of application Ser. No. 237,274, filed Mar. 23, 1972, and now abandoned.

BACKGROUND OF THE INVENTION

The art of coating surfaces, as for example, painting a metal surface to impart a protective or decorative coating onto the metal surface, is an old and widely practiced art. The techniques for applying compositions which contain film-forming resins, both natural and synthetic and which may be pigmented, otherwise colored or opaqued, are varied, depending upon the compositions employed, the requirements of production and the skill of the appliers. Because most commercial coating compositions require rapid drying, solvents or vehicles employed for dissolving or suspending the film-forming materials, pigments and coloring or opaquing agents are normally highly volatile and, according to present day techniques, are lost to the ambient atmosphere. This has led to the employment of inexpensive materials such as toluene, V&PM naphthas and the like. However, because these solvents are flammable, little or no effort has been made to recover them and reuse them; as a matter of fact, some processes burn the vapors given off during the drying step. Recent demands for safer materials from the fire hazard standpoint has prompted exploration into the use of less flammable liquids such as the halogenated hydrocarbons. These materials are relatively expensive and therefore must be recovered if they are to be used industrially. Therefore, the use of these solvents has not gained any prominence in industrial coating processes.

The aforedescribed properties of the solvent vehicles, particularly their high volatility, contribute to uneven surfaces and the attendant loss of gloss of the coating. In some instances, a haze or "blush" develops as a result of high volatility and rapid evaporation, particularly on a moist or humid day. To overcome the loss of gloss and to produce a more uniform surface with greater reflective properties, the technique of the thermal reflow, i.e., heating the thermoplastic coating to its softening point to permit it to level itself, is practiced as a normal phase of the required "bake." The "bake" is required to drive off residual solvent and, in some instances, to cause a reaction of the film-forming material, e.g., either chemical cross-linking, or a reaction somewhat similar to that achieved with driers in conventional paints and lacquers. Solutions to the many problems have been suggested, and in small scale operations, one answer again comes to the foreground - use of the less flammable solvents and blends of these solvents to obtain desirable drying times. This, as discussed above, has not become widespread because of its cost when employed in present-day techniques.

It is an object of the present invention to provide a process for coating surfaces with desirable film-forming materials, which may be pigmented, colored, opaqued or unpigmented, by application from substantially nonflammable organic solvents in an ecologically satisfactory manner.

A further object of the present invention is to provide a process for coating surfaces utilizing a nonflammable organic solvent and recovering the solvent for reuse thereby to provide an economically satisfactory process.

A still further object of the present invention is to provide a process for coating surfaces which requires no release of solvents to the atmosphere during "drying" and if a thermal bake or cure is necessary or desirable, a process which produces low residual solvent content in the surface coating thereby reducing solvent released to the atmosphere during bake or cure, thus providing an ecologically satisfactory process.

Another object of the present invention is to provide a process for coating which permits the preparation of coatings of up to 2 or more mils in thickness in a single application of coating composition which coatings have a high gloss, level coat in time periods equal to or less than that time normally required to obtain equivalent coat thickness using the conventional solvents and coating techniques.

A still further object is to provide a process which permits a primer coating to be applied followed by one or more top coats without intermediate baking or curing of the primer coat or the top coats.

These and other objects and advantages of the present process will be apparent to those skilled in the art from the following description and claims.

BRIEF DESCRIPTION OF THE INVENTION

Figure 1:
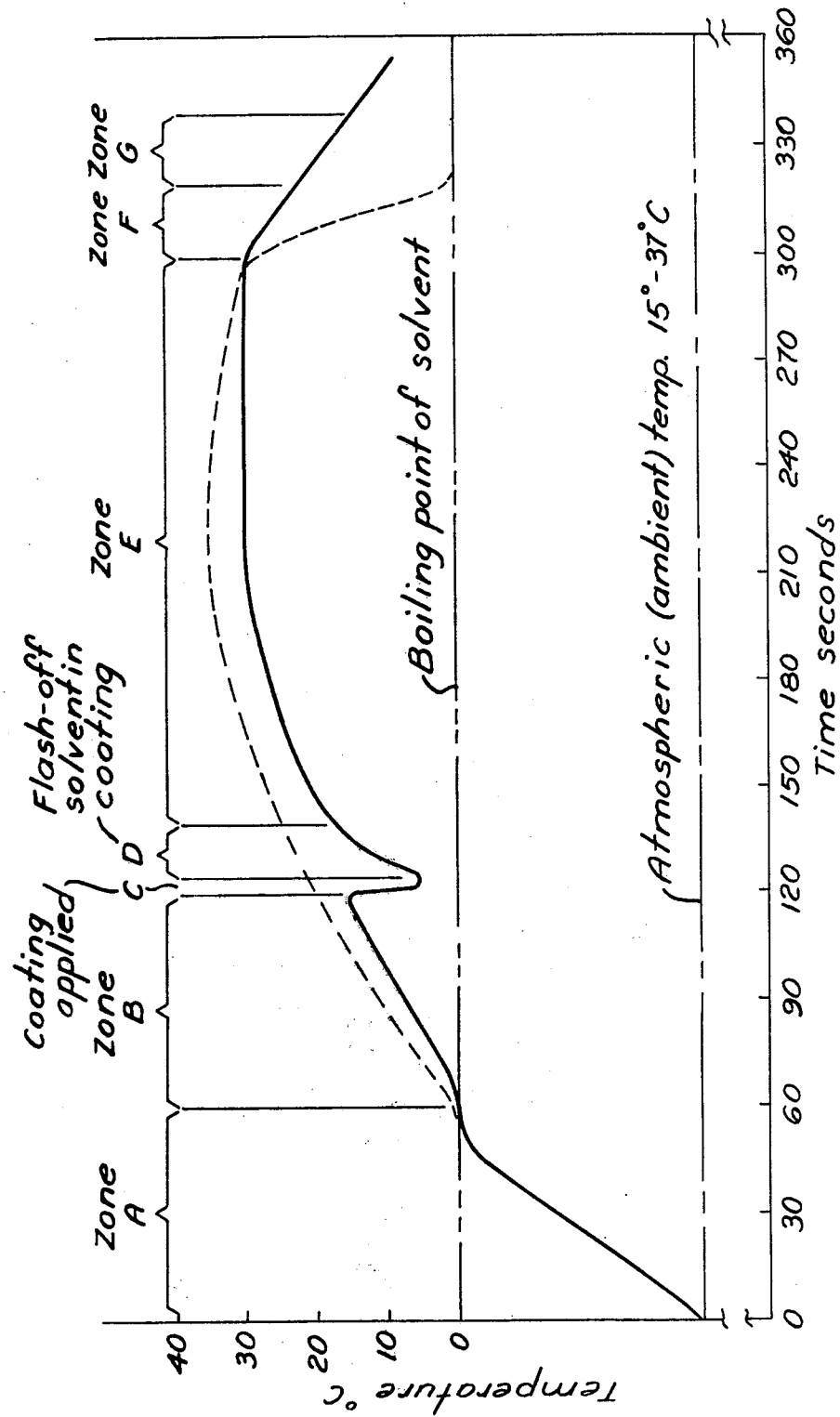
FIG. 1 is a graphic illustration of the mean temperature of the article as it passes through the successive process steps of the invention.

In accordance with the present invention, there is provided an improved process for applying a coating of a film-forming composition to a substrate. The improvement comprises applying a coating to a base, such as metal, in a controlled environment of vapors having at least one zone remote from the ambient atmosphere and consisting essentially of substantially air-free vapors of a volatile organic solvent maintained at a temperature at least 10° above the boiling point of the highest boiling constituent of the volatile solvent vehicle of the coating composition. Subsequent to coating, the substrate is maintained in the same or a contiguous zone of the vapor environment for a period of time sufficient to vaporize the solvent vehicle from the coating.

More particularly, the method of the present invention consists of establishing a controlled environment having an ambient atmosphere interface and having a zone or series of zones of substantially air-free vapors of a volatile organic solvent, preferably nonflammable vapors, and more preferably, the same organic solvent employed in the coating vehicle composition. Each zone within the environment is remote from the ambient atmosphere. The article to be coated is introduced into and through the interface into the environment, thence into and through a zone or zones of higher temperature vapors of the environment while performing the application, gelation and drying of the coating. The employment of such a zone or zones provides a favorable condition(s) for the application of the coating, the gelation of the coating, and the evaporation of the coating solvent vehicle, each at a controlled rate; that is to say, the evaporation of solvent vehicle from the coating during each step is controlled at such a rate as to:

1. cause rapid gelation, yet prevent "skinning over" of the film surface,
2. cause vaporization of solvent vehicle at a rapid enough rate to prevent sagging or running of the coating composition, and
3. cause vaporization of solvent vehicle at a slow enough rate to permit leveling of the coating to develop a maximum reflective surface necessary to high gloss appearance.

The steps of the process in their broadest aspect consist of:

1. establishing an environment having an interface with the ambient atmosphere and consisting of substantially air-free vapor of a volatile medium which is stable under the temperature of operation, preferably non-flammable, and which is either the same as or is capable of separation from the coating solvent vehicle,
2. providing within the environment a zone or zones of vapor at a temperature or temperatures at least ten degrees above the boiling point of the highest boiling constituent of the solvent vehicle for the coating composition, which zone or zones are remote from the ambient atmosphere,
3. providing a coating composition containing a volatilizable solvent vehicle for the film-forming material and pigments or coloring agents, if any, which can be heated in its liquid state under pressure to a temperature sufficient that during its application to a substrate, such as a metal sheet, evaporation of its solvent will not materially affect, that is alter, the temperature of the environment, including the zone or zones, or the surface to which the coating is applied, i.e., materially cooling the environment, zone or zones or surface,
4. introducing the article or substrate into the environment for a time sufficient to bring at least its surface temperature to about the environment temperature,
5. introducing the substrate into a zone, or the first of such zones, within the environment and maintaining it therein to raise its surface temperature to near that of the zone,
6. applying the coating,
7. maintaining the so-coated substrate at the same temperature in the same zone or at a different, preferably higher, temperature in a contiguous zone to effectuate gelation of the coating,
8. maintaining the gelled coated substrate at the same temperature in the same zone or at a different temperature in a contiguous zone to effectuate the evaporation of the solvent from the gelled coating, drying it, and
9. withdrawing the now dry, tack-free, substantially solvent-free coated substrate from the environment.

The temperature of the environment and the temperature of the zone or zones are each independently established to prevent loss of solvent to the ambient atmosphere and to provide a transfer of heat to the substrate and coating composition to effectuate an optimum gelation and rapid drying of the coating. The drawing, FIG. 1, illustrates a representative configuration of the mean temperature profile of the substrate and coating during their presence in the various atmospheres, environments and zones, as well as the zone temperatures. The process by its very nature, in order to remove solvent vehicle from the coating, must possess, in the remote zone or zones wherein solvent vehicle is vaporized from the coating, a minimum temperature of at least several degrees above the coating composition solvent vehicle boiling temperature. However, to minimize loss of solvent to the ambient atmosphere, the environment temperature must be such that at the interface between the ambient atmosphere and the environment the vapors of environment are capable of condensing with minimum loss of solvent to the ambient atmosphere.

Thus, the zone temeprature(s) must be sufficiently above the vehicle solvent boiling point such that the cooling effect of the evaporation of solvent vehicle from the coating (which is accomplished principally by the heat content of the vapors in the zone) will not lower the heat content of the zone. Additionally, however, the temperature of the environment cannot be too much above the solvent boiling point otherwise the solvent in the coating will flash-off too quickly resulting in loss of gloss and poor leveling, i.e., surface imperfections caused by breaking of the surface skin as solvent in the interior of the coating in vaporized, etc. Likewise, the surface to be coated must be brought into the environment and preconditioned therein to adjust its temperature to (or near) that of the coating zone temperature.

The results of the process of the present invention are advantageously achieved when the vapor employed to establish the zone or zones is a halogenated hydrocarbon solvent vapor produced from halogenated hydrocarbons, such as trichloroethylene, methylene chloride, methylchloroform, or the like, the fluorinated hydrocarbons, mixed chlorofluorohydrocarbons and the like, and the solvent vehicle for the coating composition is likewise a halogenated hydrocarbon, preferably the same as that to be employed in the zone or zones of the process. Thus, coating compositions such as described in the copending application of Patrick H. Martin, entitled "Coating Compositions," filed even date herewith, are especially useful in carrying out the process of the present invention when employing methylene chloride, methylchloroform, or trichloroethylene as the solvent vehicle of the present process.

DETAILED DESCRIPTION OF THE INVENTION

In accordance with the present invention, an environment is established within a chamber having a means for containing the environment at at least one interface with the ambient atmosphere through which interface articles to be coated are introduced into and withdrawn from the environment. The environment consists of the vapors of a halogenated hydrocarbon solvent. The environment is preferably considered an interface and a series of zones. The environment which contains the interface with the ambient atmosphere, is in equilibrium with the ambient atmosphere and the remaining zones are remote from this interface. The temperature of the remote zones are each controlled to maintain the vapors within that zone at a temperature to condition the article prior to coating and control evaporation of coating solvent from the coating composition after application to accomplish the gelation and drying of the applied coating. The zones are each provided with the means to maintain their temperature and to supply them with vapor.

Figure 2:
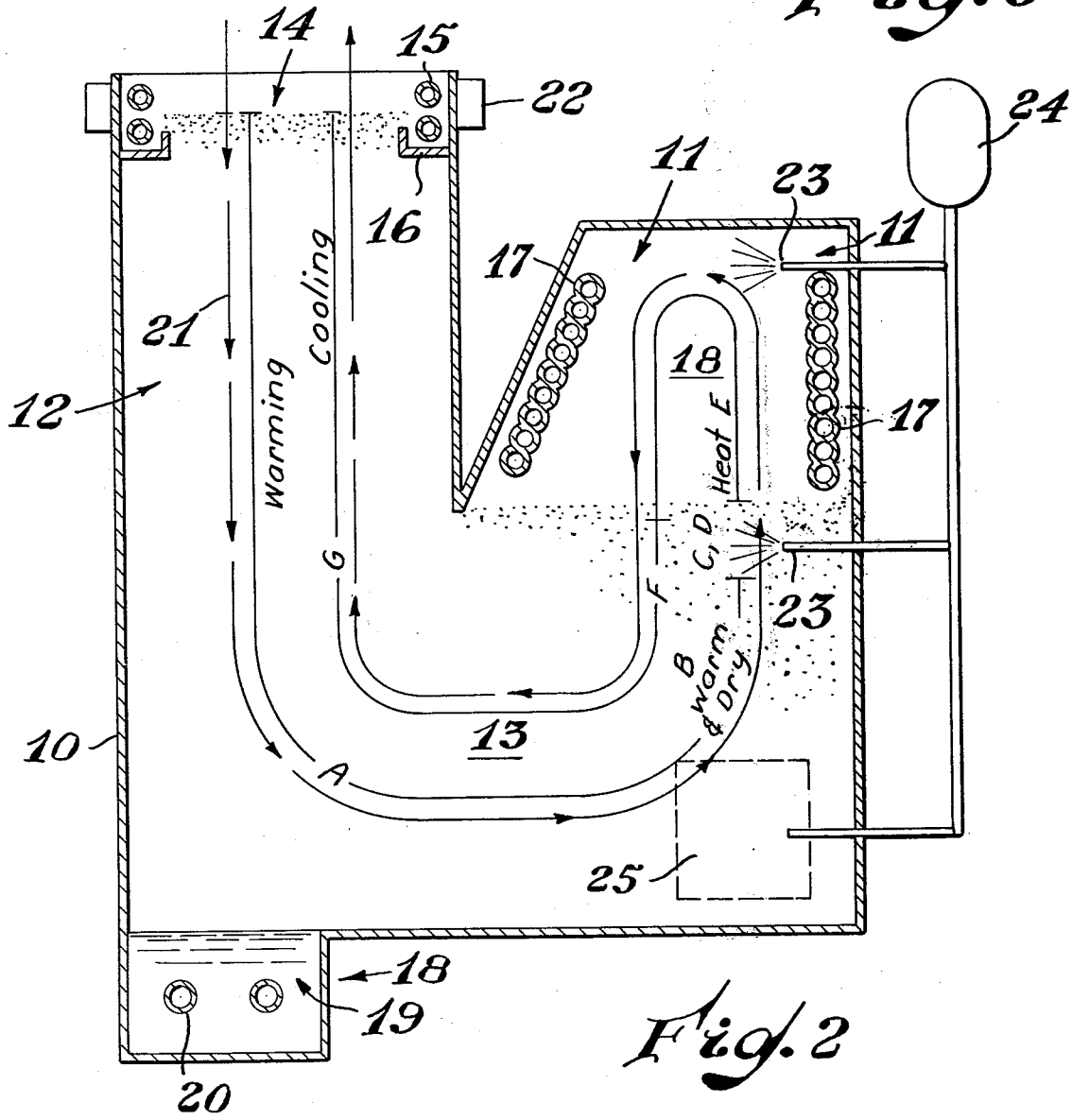
FIG. 2 represents in side elevation an apparatus suitable for carrying out the process of the invention and showing the path of the article through the apparatus as related to the time-temperature curve of FIG. 1.

FIG. 1 represents in graphic form the approximate mean temperature of an article as it passes through an apparatus such as illustrated in FIG. 2. It is to be understood that the temperatures indicated on the graph at the entrance and exits of zones A, B, E and F are measurable but that the actual temperatures of the article in zones C and D are approximate and based on visual observations that no condensation occurs on the surface of the article and that theoretically the cooling effect of evaporation of solvent from the coating is not sufficient to lower the article's mean temperature below the solvent boiling point. The zone temperatures are indicated in phantom line with the interfacial zones, such as B and F, zone B having a gradual temperature rise from zone A temperature to zone E temperature and zone F having gradual fall from zone E to zone G which is but the counter of zone A.

Figure 3:
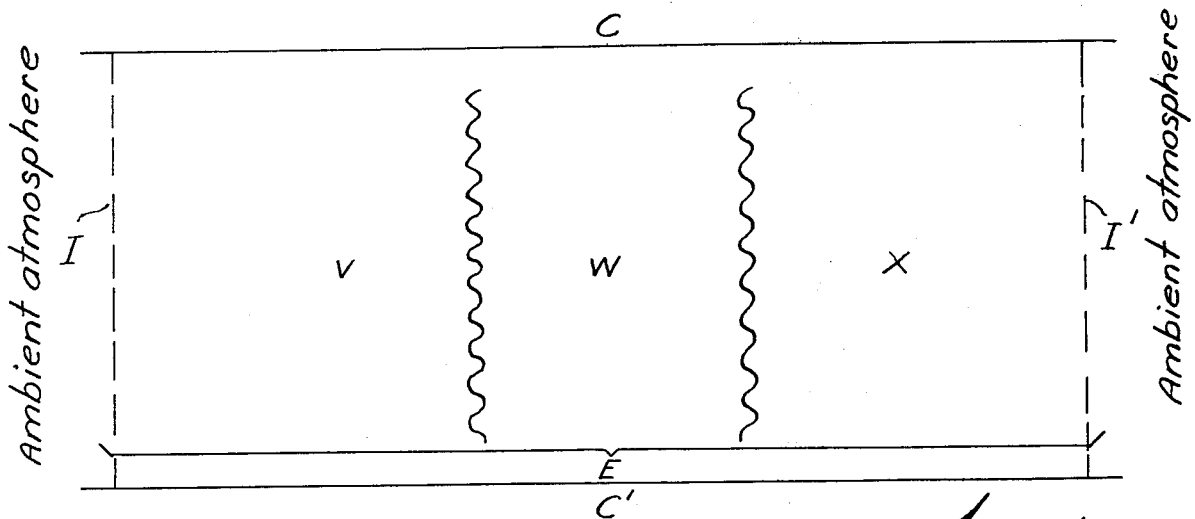
FIG. 3 represents a block diagram of the zones which are established within an environment of the present invention.

In schematic diagram the above criteria are illustrated in FIG. 3. The pair of solid lines C and C' represents the confining means necessary to establish and maintain an environment E different from the ambient atmosphere. The interface between the environment and the ambient atmosphere is represented by the dash lines I and I' at each end of the solid lines C and C'. The environment E is divided into three zones, V, W and X. The environment E contains the interface I and I', respectively, which interface is composed of saturated vapors of a halogenated hydrocarbon solvent. Zones V and X are likewise composed for the most part of saturated vapors, but their temperature progressively increases as the vapors approach zone W which consists of superheated vapors of the same solvent which are at a temperature at least 10° above the atmospheric boiling point of the solvent. The heat energy necessary to maintain the condition in each zone is independently supplied to each zone, or because a temperature gradient is established from the heat energy source to the interface through natural laws, it is possible to introduce heat energy into only one zone and take advantage of the natural laws to establish zones of different temperatures within the environment. For purposes of clarity only, without limiting the scope of the present invention, temperatures and steps of the present invention will be described with relation to the schematic illustration of FIG. 2 and the temperature profile of FIG. 1.

An article to be coated, and in equilibrium with the ambient atmosphere, that is to say, it has the approximate temperature of the ambient atmosphere and is enveloped thereby, or an article which has been preheated, is introduced through interface I into environment E. Environment E contains vapors of the halogenated solvent which at the interfaces I and I' and in most of zones V and X are, in the most preferred embodiment of the invention, saturated vapors of the solvent. When the article, at ambient temperature, is immersed in the saturated vapors of a halogenated solvent, the solvent condenses on its surface giving up the heat of vaporization to the article thereby raising the article's surface temperature, at least to the extent the heat energy is absorbed. If the article remains immersed in the vapors for a time, it will eventually achieve for all practical purposes the same temperature as that of the vapors. This result, of course, is dependent upon the continued presence of saturated vapors brought into contact with the article's surface. The present invention in its preferred embodiment utilizes this phenomenon to condition the article for subsequent steps in the process. However, if the article has been preheated before introduction into the environment, condensation will probably not take place, although the article may acheive a lower temperature through radiation losses to the environment. Its temperature will depend on the degree of preheat and the length of time in the environment.

The article, having achieved or nearly achieved the temperature of the vapors in its passage through zone V enters zone W where its temperature is raised due to the higher temperature to zone W. The article is coated with a coating composition containing, as the principal solvent vehicle, a halogenated hydrocarbon solvent. Preferably, the solvent vehicle is the same halogenated hydrocarbon solvent employed to establish the environment E. Following the coating step, the article remains in zone W for a sufficient time to cause gelation of the coating composition at a rapid enough rate to prevent sagging or running, yet at a rate slow enough to allow the coating to "level." Following gelation, the article is introduced into zone X, which is for the most part a vapor zone whose temperature is well above the solvent boiling point. Evaporation of the solvent vehicle may continue as the article is now at a temperature above the boiling point of the solvent and the saturated vapor temperature. The article is then introduced through interface I' out of environment E into the ambient atmosphere. The article, being at a temperature above the environment solvent boiling point, passes through zone X and interface I' into the ambient atmosphere without any condensation of the lower temperature vapors on it. The article is now coated with a tack-free coating which contains very little residual solvent vehicle and which, if baking is desired, will not release at the elevated bake temperatures any substantial amount of solvent vehicle to the ambient atmosphere.

The means for establishing the environment and the zones therein is not critical and several means will become apparent immediately to those skilled in the art. For example, one means for accomplishing the temperature control of the environment is to provide heaters within the environment which radiate and conduct heat to the environment. Another means for providing adequate temperature control of the environment is to withdraw a portion of the vapors continuously and heat the withdrawn vapors outside the environmental enclosure and return them in their heated condition to the environmental enclosure.

It is to be understood that the means for coating the surface is not critical so long as the coating composition can be supplied in sufficient quantities and at a temperature at, near or above the boiling point of the solvent vehicle(s) in the composition and below that temperature whereat the solvent vehicle(s) will vaporize violently from the composition as it is being applied. The application means may take any form such as airless spray, pneumatic atomizing spray, dip technique, knife coating applicator, roller coating or flooding technique. For spray techniques, the coating composition may be heated by any convenient means so long as the temperature can be controlled.

Many modifications in the apparatus and techniques for establishing the environment, controlling its temperature, applying the coating composition at a controlled temperature, too numerous to mention, will become apparent to the skilled worker from the foregoing description and the following examples.

Apparatus for carrying out the process of the present invention may take one of several configurations. One such configuration is illustrated in the drawing, FIG. 2. Other configurations will become apparent to those skilled in the art from the following description and claims.

The apparatus illustrated in FIG. 2 comprises an enclosure 10 having two zones 11 and 12 extending from chamber 13. Zone 11 is shorter than zone 12 and is closed to the atmosphere. Zone 12 is open to atmosphere at a point 14 above the upper most height of zone 11. Interior of the opening 14 of zone 12 is a cooling means 15 and a condensate collecting trough 16 for collecting condensate which forms on cooling means 15. Within zone 11 is located a heating means 17 which provides a source of heat to the zone. Located near the bottom of chamber 13 is a sump 18 containing a vaporizable liquid 19 and means 20 for vaporizing the liquid 19. A conveyor means 21 is located within enclosure 10 in a manner to transport an item from the opening 14 down zone 12, across chamber 13, up into zone 11 and return the item in reverse order to the opening 14. The exterior of enclsoure 10 is insulated to reduce loss of heat from the enclosure. A cold wall 22 may be located exterior of but integral with the walls of zone 12 to maintain the walls of zone 12 from carrying heat above the level of cooling means 15. Located within zone 11 is a coating application means 23 which is illustrated as spray nozzles. The nozzles are supplied a heated coating composition from a reservoir 24 under pressure, preferably hydraulic pressure. Alternatively, the coating may be applied from a dip tank represented by area 25.

In a representative operation of the process of the present invention employing the apparatus of FIG. 2, a 4 × 12 panel of sheet steel was coated with a titanium pigmented acrylic acid ester lacquer dissolved and suspended in trichloroethylene at 40.5% solids. The coating operation was run on a conveyor passed through the apparatus at 40 feet per minute. The coating composition was applied from an airless spray nozzle orifice under 1000 psi pressure. The application was made in the lower part of zone 11 at 140° C. The paint was dried on the panel while maintaining this temperature for 30 seconds; the painted panel was then conveyed to the top of zone 11 where, at a temperature of 165° C., it was dried further for 60 seconds. The panel was then removed to the ambient atmosphere and oven-baked for 15 minutes. The coating was 2.0 mils thick and by visual observation had a high gloss, appeared level with no apparent surface imperfections and adhered well to the panel.

Coatings applied according to conventional commercial procedures, in air, employing similar coating compositions with conventional lacquer solvents require several (2 or more) spray passes to obtain 2 mils of film thickness and required a 15 to 30 minutes bake at about 160° C. to obtain a level glossy coat having good adhesion.

Several additional runs were made in the apparatus described above using different paint compositions, different temperatures, single and multiple passes, etc. The results of such runs are set forth below. Reference letters in the heading refer to the letters adjacent the path of the article through the apparatus of FIG. 2 as lettered thereon.

| Paint | Conveyor Speed feet/min. | Paint Temperature °C. | Coating Nozzle Pressure psi | T °C. and time (sec.) preheat prior to painting Zone C | Application Zone D T° C. | T °C. and time (sec.) Zones E, F, G | T °C. and time (sec.) Zones H, I | Bake in air after Removal from Apparatus T° C. and time (min.) | Coating Thickness mils | Gloss | Leveling | Sagging at Bottom of Panel |
|---|---|---|---|---|---|---|---|---|---|---|---|---|
| A) Rinshed-Mason white formulation modified by mfgr. by replacing conventional vehicles with trichloroethylene to 40% nonvolatiles. | 40 | 80 | 1000 | 140/30 | 100 | 140/30 | 165/60 | 160/15 | 2 | Good | Good | No sag[1] or bead at bottom |
| B) Con Chem. Co. white baking enamel (Lot IG 0723) prepared in trichloroethylene to 40% nonvolatiles. | 19 | 110 | 800 | 92/45 | 92 | 110/5 | 92/90 | 160/15 | 0.5–1 | Good | Slight Orange Peel | Slight bead at bottom |
| C) Rinshed-Mason automotive metallic medium blue "Metallic Thermoplastic Acrylic Lacquer" Lot L 68BD068 in which conventional solvent system was boiled away and replaced with methylene chloride to 15% nonvolatiles. | 33 5 passes | 70 | 1500 | 50/- | 50 | 50/15 each pass | 85/60 then 100/60 | 160/15 | 2 | [2] | Good | No bead |
| D) Bisphenol A-epichlorohydrin epoxy resin average molecular weight about 21000 (DER 684), iron oxide pigment, 28% nonvolatiles in methylene chloride | 19 | 60 | 1500 | 47/120 | 50 | 50/90 | None | None | 2 | Fair | Fair | Bead at[3] Bottom |
| This coated panel was reinserted into the apparatus after preheating to 50° C. in air and a topcoat applied as follows: | | | | | | | | | | | | |
| Composition of C | 33 4 passes | 70 | 1400 | None | 56 each pass | 56/15 | 56/60 after last pass | 160/15 | 1.5 | [2] | Good | No bead or sagging of top |

| Paint | Conveyor Speed feet/min. | Paint Temperature °C. | Coating Nozzle Pressure psi | T °C. and time (sec.) preheat prior to painting Zone C | Application Zone D T° C. | T °C. and time (sec.) Zones E, F, G | T °C. and time (sec.) Zones H, I | Bake in air after Removal from Apparatus T° C. and time (min.) | Coating Thickness mils | Gloss | Leveling | Sagging at Bottom of Panel |
|---|---|---|---|---|---|---|---|---|---|---|---|---|
| | | | | | | | | | | | | coat |

This example illustrates a topcoat can be applied over a still solvent-sensitive primer. [1]Upon application, the surface had a stippled textured appearance which immediately started to level out and become smooth before the paint film was immobilized by solvent loss and before the panel was transported to the 165° C. zone.
[2]Metallic appearance good.
[3]More dilute solution of paint would improve, but for purpose of determining ability to apply topcoat over primer without baking, this was sufficient.

We claim:
1. An improved method for forming a film on a surface comprising
   establishing a first zone of vapors of a volatile organic solvent employed in coating composition containing the film forming agent, said zone being at atmospheric pressure and at the atmospheric boiling point of said organic solvent.
   establishing a second zone of vapors of said volatile organic solvent in interfacial relationship with said first zone but substantially free of direct contact with the ambient atmosphere, said second zone being maintained at a temperature above the atmospheric boiling point of said organic solvent by supplying heat to said zone external of said heat of vapors arising from the coating composition or the first zone;
   introducing the surface to be coated into said first zone;
   applying the coating composition to said surface upon the surface reaching equilibrium with said zone;
   introducing said coated surface into said second zone and maintaining said coated surface and said second zone in such condition that solvent will evaporate from the applied film at a controlled rate such that the film is gelled to prevent its sagging, held in this gelled state in said second zone for a time sufficient for surface imperfections to level out, and finally dried to a tack free and essentially solvent free condition, the surface being then at a temperature above the atmospheric boiling point of said organic solvent;
   and removing said surface from said second zone through said first zone or a third zone of the same nature as said first zone into the ambient atmosphere.

2. An improved method for forming a film on a surface according to claim 1 wherein the solvent of the solvent vapor zone is the same solvent as the principal constituent of the solvent vehicle in the film-forming composition.

3. An improved method for forming a film on a surface according to claim 2 wherein the solvents comprising the solvent vehicle of the film-forming composition and the solvent vapor zone are halogenated solvents such that the vapor zone may be contained by virtue of its density and by a condensing zone around its upper periphery at the solvent vapor interface for the purpose of containment and recovery of the solvent evaporated from the paint film.

4. An improved method for forming a film on a surface according to claim 1 wherein the solvent of the solvent vapor zone is a different halogenated hydrocarbon solvent from the principal constituent halogenated hydrocarbon solvent vehicle in the film forming composition to be applied.

* * * * *

UNITED STATES PATENT AND TRADEMARK OFFICE
CERTIFICATE OF CORRECTION

PATENT NO. : 4,007,304
DATED : February 8, 1977
INVENTOR(S) : James L. Dunn, Jr.; John K. Ward; Patrick H. Martin It is certified that error appears in the above-identified patent and that said Letters Patent are hereby corrected as shown below:

Col. 1, under the title, insert heading -- CROSS-REFERENCE TO RELATED APPLICATION --.

Col. 1, line 41, after "of" delete "the"

Col. 4, line 6, delete "temeprature(s)" and insert -- temperature(s) --

Col. 4, line 17, following "coating" delete "in" and insert -- is --

Col. 5, line 65, delete "acheive" and insert -- achieve --

Col. 6, line 4, delete "to" and insert -- of --

Col. 6, line 27, insert quotation marks (") around the word "baking"

Col. 6, line 28, insert quotation marks (") around the word "bake"

Col. 7, line 15, delete "enclsoure" and insert -- enclosure --

Col. 7, line 28, delete " 4 x 12 " and insert -- 4" x 12" --

UNITED STATES PATENT OFFICE
CERTIFICATE OF CORRECTION

Patent No. 4,007,304　　　　　　　Dated February 8, 1977

Inventor(s)　James L. Dunn, Jr., et al.

It is certified that error appears in the above-identified patent and that said Letters Patent are hereby corrected as shown below:

Column 9, line 25, delete the period (.) after "solvent" and insert -- ; --.

Signed and Sealed this

Twenty-eighth Day of June 1977

[SEAL]

Attest:

RUTH C. MASON
*Attesting Officer*

C. MARSHALL DANN
*Commissioner of Patents and Trademarks*